UNITED STATES PATENT OFFICE.

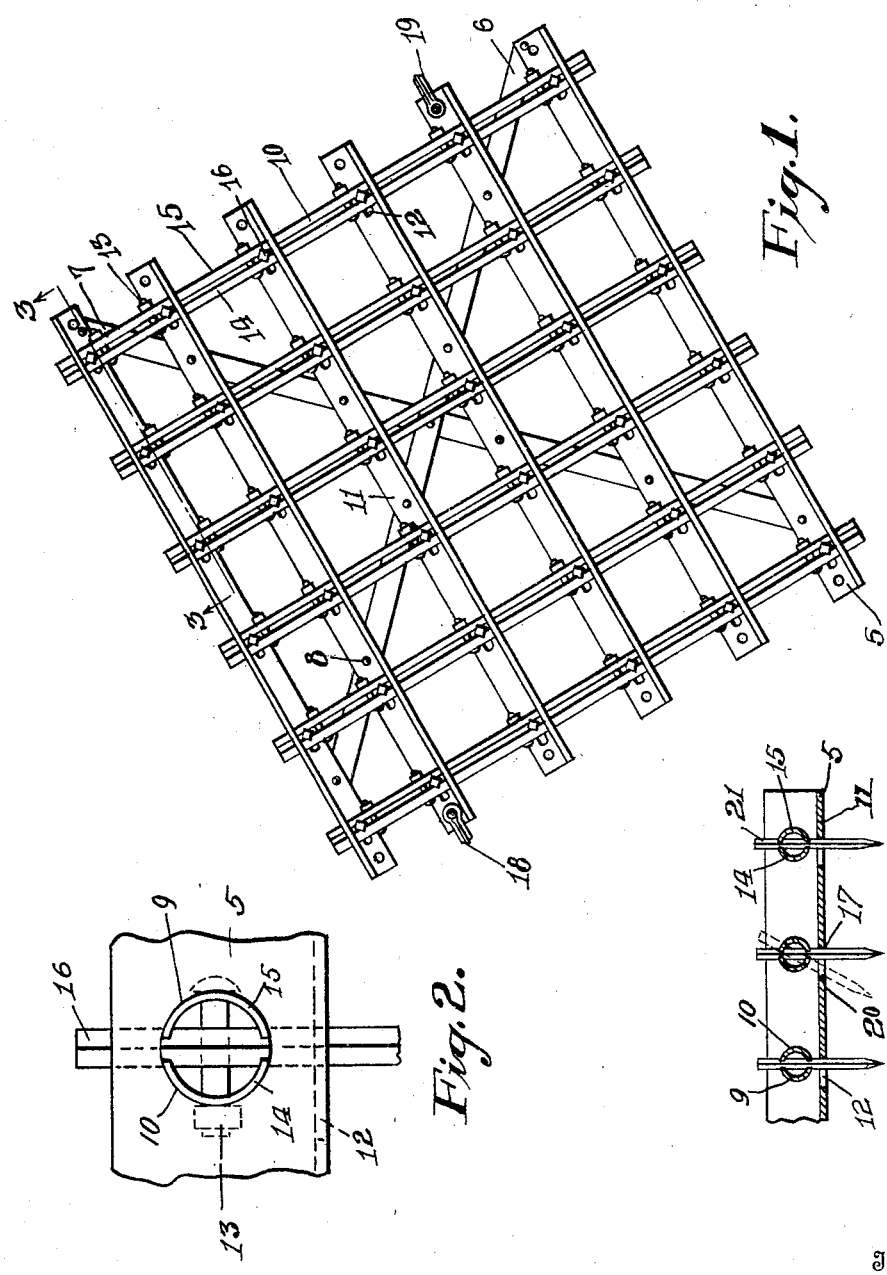

ROBERT WITHERS PAYNE, OF DRAKES BRANCH, VIRGINIA.

HARROW.

1,386,584.  Specification of Letters Patent.  Patented Aug. 2, 1921.

Application filed November 4, 1919. Serial No. 335,657.

*To all whom it may concern:*

Be it known that I, ROBERT W. PAYNE, a citizen of the United States, residing at Drakes Branch, in the county of Charlotte and State of Virginia, have invented a new and useful Harrow, of which the following is a specification.

This invention relates to improvements in harrows, and more particularly to harrows of the spike toothed type.

The primary object of the invention is to provide a combination harrow for heavy and light work.

A further object of the invention is to provide a harrow of this type wherein the teeth thereof may be automatically moved from a vertical position to an inclined position, thus eliminating the use of levers and connecting rods for accomplishing this result.

A still further object of the invention is to provide a construction which will remove the strain usually directed to the transverse supporting bars, and direct the same to the longitudinal bars of the harrow frame.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a plan view of a harrow constructed in accordance with the present invention, and disclosing the angle at which the same operates.

Fig. 2 is a fragmental elevational view of one of the longitudinal bars, and one of the teeth.

Fig. 3 illustrates a fragmental section view taken on line 3—3 of Fig. 1.

Referring to the drawing in detail, the harrow forming the subject matter of the present invention includes the longitudinal right angled bars 5, secured in spaced relation with each other by means of the angularly disposed brace rods 6 and 7 which have connection with the outer bars 5, adjacent the end thereof, and have connection with the intermediate longitudinal bars by means of the bolts 8, passing through openings formed in the longitudinal bars, the openings registering with suitable openings in the angularly disposed brace rods.

Each of these longitudinally disposed bars is provided with openings 9, provided in the vertical wall thereof, and disposed in spaced relation throughout the length thereof, the openings of one bar 5 being in alinement with the openings of the adjacent bar 5 to accommodate the tooth supporting bars 10, so that the bars 10 may be free to move therein, the bars 10 being of a construction to conform to the curvature of the openings 9, to permit of such movement.

These bars 5 also include right angled portions, 11, which right angled portion of each bar 5 is provided with a plurality of slots 12, formed throughout the lengths thereof which slots accommodate the spike teeth of the harrow, the teeth being of a size to permit the same to move within the slots to assume various positions.

The tooth supporting bars include pairs of transversely disposed bars, secured together by means of the bolts 13 passing through suitable registering openings therein, the bars forming the respective pairs being indicated by the numerals 14 and 15, and as shown, these bars are provided with the cut out portions 16, registering with each other to accommodate the teeth of the harrow, the openings, or slots 12, being disposed directly under the cut out portions 16, so that harrow teeth supported by the cut-out portions 16 extend into the slots 12, and when the teeth are in a vertical position, the same contact with the end walls 17, and restrict movement thereof, so that the teeth are supported in a vertical position, for accomplishing the harrowing result, to be employed on newly plowed fields.

When the harrow is to be employed for rough work, or to harrow newly plowed soil, the draft appliance has connection with the harrow through the medium of the clevis 18, but when the draft appliances are attached to the clevis 19, the teeth of the harrow contacting with the ground causes the teeth to move to contact with the walls 20, at the opposite ends of the slots, consequently supporting the teeth 21 of the harrow in an inclined position, thus adapting the harrow for light or finishing work.

It might be further stated that the strain which is usually directed to the supporting bars of the harrow, is directed to the right angled portions 11 of the bars 5, the end walls of the slots receiving a greater part of the strain.

It will thus be seen that if the harrow contacts with stationary objects in a field, such as for instance a stump or an exceptionally large rock, the jar would cause the bending of the teeth 21, and not the bending of the bars forming the frame of the harrow. It is obvious that in view of the location of the clevises 18 and 19, the harrow is moved over a field at an angle with relation to the horizontal central line of the harrow with the result that the teeth assume a staggered relation with each other, contacting with the entire ground surface, over which the harrow is operating.

Having thus described the invention, what is claimed is:—

A harrow including longitudinal bars, each of said bars comprising an angle iron, said angle irons having openings formed in spaced relation with each other, said openings being formed in the vertical walls of the angle irons to provide bearings, said angle irons having slots formed in the horizontal walls thereof, the slots being disposed adjacent the bearing openings, teeth supporting bars arranged in pairs having curved surfaces and relatively straight surfaces, the curved surfaces adapted to contact with the walls of the bearings for permitting movement of the teeth supporting bars, teeth carried between the teeth supporting bars of each pair, means for securing the bars in engagement with the teeth, said teeth adapted to be positioned in the slots and adapted to move therein, said teeth adapted to restrict lateral movement of the teeth supporting bars, and the ends of said slots adapted to restrict movement of the teeth longitudinally of the slots.

In testimony that I claim the foregoing as my own, I have hereto affixed my signature in the presence of two witnesses.

ROBERT WITHERS PAYNE.

Witnesses:
J. C. GREGORY,
J. C. BOOTH.